United States Patent

Clark et al.

[11] Patent Number: 6,021,140
[45] Date of Patent: Feb. 1, 2000

[54] POLARIZATION BASED MODE-LOCKING OF A LASER

[75] Inventors: James B. Clark, Campbell; David E. Spence; Richard D. Boggy, both of Sunnyvale; James D. Kafka, Mountain View, all of Calif.

[73] Assignee: Spectra-Physics Lasers, Inc., Mountain View, Calif.

[21] Appl. No.: 09/062,057

[22] Filed: Apr. 17, 1998

[51] Int. Cl.[7] .................................................. H01S 3/098
[52] U.S. Cl. ........................ 372/18; 372/22; 372/27; 372/105; 372/92
[58] Field of Search .......................... 372/18, 22, 27, 372/105, 106, 92

[56] References Cited

U.S. PATENT DOCUMENTS

| | | | |
|---|---|---|---|
| 3,700,307 | 10/1972 | Glenn | 350/157 |
| 4,063,105 | 12/1977 | Aggarwal et al. | 307/88.3 |
| 4,063,195 | 12/1977 | Abrams et al. | 332/7.51 |
| 4,085,335 | 4/1978 | Guilino | 307/88.3 |
| 4,128,772 | 12/1978 | Chang et al. | 307/88.3 |
| 4,321,550 | 3/1982 | Evtuhov | 330/4.3 |
| 4,330,721 | 5/1982 | Hauck et al. | 307/425 |
| 4,348,599 | 9/1982 | Pradere et al. | 307/426 |
| 4,349,907 | 9/1982 | Campillo et al. | 372/92 |
| 4,618,783 | 10/1986 | Pradere et al. | 307/426 |
| 4,682,340 | 7/1987 | Dave et al. | 372/108 |
| 4,829,528 | 5/1989 | Band et al. | 372/3 |
| 4,914,658 | 4/1990 | Stankov et al. | 372/18 |
| 5,249,190 | 9/1993 | Kortz et al. | 372/22 |
| 5,263,038 | 11/1993 | Lukas et al. | 372/22 |
| 5,610,759 | 3/1997 | Delacourt et al. | 372/22 |
| 5,627,848 | 5/1997 | Fermann et al. | 372/18 |
| 5,642,375 | 6/1997 | King et al. | 372/92 |
| 5,684,623 | 11/1997 | King et al. | 372/21 |

OTHER PUBLICATIONS

Yarborough, J.M. et al., *Applied Phys. Lett.*, vol. 18, No. 3, pp. 70–73 (Feb. 1971).

Stankov, K.A. et al., "A New Mode Locking Technique Using A Non–linear Mirror", *Optics Communications*, vol. 66, No. 1, pp. 41–46 (Apr. 1988).

Stankov, K.A. et al., "A Novel Nonlinear Optical Device for Passive Mode Locking", IEEE Conference on Lasers and Electro Optics, 1988 Technical Digest Series, vol. 7, p. 328 (Apr. 1988).

*Primary Examiner*—Leon Scott, Jr.
*Attorney, Agent, or Firm*—Wilson Sonsini Goodrich & Rosati

[57] ABSTRACT

The present invention is a system and method for mode-locking a laser, comprising reversibly converting radiation in the laser at a fundamental frequency into radiation at a second harmonic frequency, discriminating the radiation at the fundamental frequency using a polarization of the radiation at the fundamental frequency, and reconverting the radiation at the second harmonic frequency into radiation at the fundamental frequency.

33 Claims, 1 Drawing Sheet

POLARIZATION BASED MODE-LOCKING OF A LASER

FIELD OF THE INVENTION

The invention relates to a method and apparatus for mode-locking lasers and in particular to the use of nonlinear optical elements to mode-lock lasers.

DESCRIPTION OF THE RELATED ART

Various lasers have been mode-locked in a number of ways in the past. One technique that has been used to mode-lock solid state lasers such as Neodymium doped Yttrium Aluminum Garnet (Nd:YAG) lasers is disclosed in U.S. Pat. No. 4,914,658 entitled "Mode-Locked Laser" by K. A. Stankov. The patent describes how a nonlinear optical crystal-mirror combination can be arranged to act like a mirror whose reflectivity at the fundamental frequency increases with intensity. The nonlinear optical crystal, a second harmonic generation crystal, is followed by a mirror that has a low reflectivity ($R_1$) at the fundamental frequency and a high reflectivity ($R_2$) at the second harmonic frequency. The optical distance between the crystal and the end mirror is adjusted using either a glass plate or by simply adjusting the path length in air to create a half wave phase shift between the fundamental and second harmonic. This phase shift, as was shown in J. M. Yarborough, J. Falk, C. B. Hitz, Applied Phys. Lett. Vol. 18, p. 70 (1970), causes a reverse in the direction of energy transfer on the second pass through the crystal, and the second harmonic is converted back to the fundamental. Thus, as the intensity at the fundamental frequency increases, starting at zero, the conversion efficiency to the second harmonic frequency increases from zero to near 100%, which causes the reflectivity of the crystal mirror combination to increase from $R_1$ to a value near $R_2$. "A New Mode Locking Technique Using A Non-linear Mirror," by K. A. Stankov and J. Jethwa, *Optics Communications*, vol. 66, No. 1, pp. 41–46, and "A Novel Nonlinear Optical Device for Passive Mode Locking", by K. A. Stankov, *Conference on Lasers and Electro Optics* (April, 1988) each recognize that a mirror whose reflectivity increases with intensity can be used to provide passive mode-locking. Essentially, Stankov mode-locks a laser by using intra-cavity second harmonic generation in combination with a dichroic mirror to generate an effective cavity mirror, the reflectivity of which is an increasing function of the intensity at the fundamental frequency.

The reflectivity $R_1$ of the mirror at the fundamental frequency affects both the output power from the laser as well as the pulsewidth of the output pulse. In general, there is an optimum value for $R_1$ which maximizes the output power of the laser. However, the pulsewidth of the output pulse will continually shorten as $R_1$ is decreased. Thus, there is a trade-off between decreased output power and shorter output pulses for smaller values of $R_1$. A series of mirrors that have different values for $R_1$ while maintaining a high value of reflectivity at the second harmonic (e.g., $R_2$=99.9%) are needed. Each time it is desired to change the output power or output pulsewidth of the laser, the mirror must be exchanged and the laser realigned. This can be a time consuming process which may require a the help of a laser technician. What is needed is a mode-locked laser in which the output power and pulsewidth can be varied during operation of the laser without requiring substantial realignment.

SUMMARY OF THE INVENTION

One of the embodiments of the invention is a method for mode-locking a laser, the method comprising reversibly converting radiation in the laser at a fundamental frequency into radiation at a second harmonic frequency, discriminating the radiation at the fundamental frequency using a polarization of the radiation at the fundamental frequency, and reconverting the radiation at the second harmonic frequency into radiation at the fundamental frequency.

According to one aspect of the invention mode-locking the laser includes introducing an additional phase shift in the radiation at the fundamental frequency relative to the radiation at the second harmonic frequency. In other aspects of the invention introducing the phase shift includes using a temperature dependent phase shift in a crystal, propagating the fundamental frequency radiation through a crystal at a predetermined orientation, or using a tilted piece of glass. In another aspect of the invention the laser includes Neodymium doped Vanadate (Nd:Vanadate). In another aspect of this embodiment discriminating includes rotating the polarization of the fundamental frequency radiation. In yet another aspect of the invention rotating includes using a waveplate.

A first embodiment of the invention is a mode-locked laser comprising a first mirror and a second mirror, spaced apart from each other, each of the mirrors having predetermined reflection characteristics, the first and second mirrors defining an optical resonator. An active laser mediumn, adapted to emit laser radiation at a fundamental laser frequency upon stimulation of the laser medium, is positioned between said first and second mirrors. A non-linear optical medium is positioned between the active laser medium and the second mirror for reversibly converting the fundamental frequency radiation into radiation of a second harmonic frequency, with the ratio of the intensity of the radiation at the second harmonic frequency relative to the intensity of radiation at the fundamental frequency increasing with increasing intensity of the fundamental frequency radiation. A polarization rotation device is positioned between the nonlinear optical medium and the second mirror, and a polarization selection device is positioned between the first mirror and the second mirror.

One aspect of this embodiment the polarization rotation device comprises a one quarter waveplate at the fundamental frequency and a one half waveplate at the second harmonic frequency. In another aspect of this embodiment the active laser medium includes Nd:Vanadate. In yet another aspect of this embodiment the reflectivity of the second mirror at the second harmonic frequency is not greater than its reflectivity at the fundamental frequency.

Another embodiment of the invention is a mode-locked laser comprising a first mirror and a second mirror, spaced from each other, each of the mirrors having predetermined reflection characteristics, the first and second mirrors defining an optical resonator. An active laser medium, adapted to emit laser radiation at a fundamental frequency upon stimulation of the laser medium, is positioned between said first and second mirrors. A non-linear optical medium is positioned between the active laser medium and the second mirror for reversibly converting the fundamental frequency radiation into radiation of a second harmonic frequency, with the ratio of the intensity of radiation at the second harmonic frequency relative to the intensity of radiation at the fundamental frequency increasing with increasing intensity of the fundamental frequency radiation. A polarization selection device is positioned between the non-linear optical medium and the second mirror.

Yet another embodiment of the invention is a mode-locked laser comprising a first mirror and a second mirror, spaced from each other, each of the mirrors having predetermined reflection characteristics, the first and second mirrors defining an optical resonator. An active laser medium, adapted to emit laser radiation at the fundamental laser frequency upon stimulation of the laser medium, is positioned between the first mirror and the second mirror. A non-linear optical medium is positioned between the active laser medium and the second mirror for reversibly converting the fundamental frequency radiation into radiation of a second harmonic frequency, with the ratio of the intensity of radiation at the second harmonic frequency relative to the intensity of radiation at the fundamental frequency increasing with increasing intensity of the fundamental frequency radiation. A wavelength selection device is positioned between the non-linear medium and the second mirror.

In one aspect of this embodiment of the invention the wavelength selection device comprises a beam splitter and a mirror, and the reflectivity of the beam splitter at the fundamental frequency is greater than its reflectivity at the second harmonic frequency. In another aspect of the invention the reflectivity of the second mirror at the second harmonic frequency is not greater than its reflectivity a the fundamental frequency.

DETAILED DESCRIPTION

Figure 1:
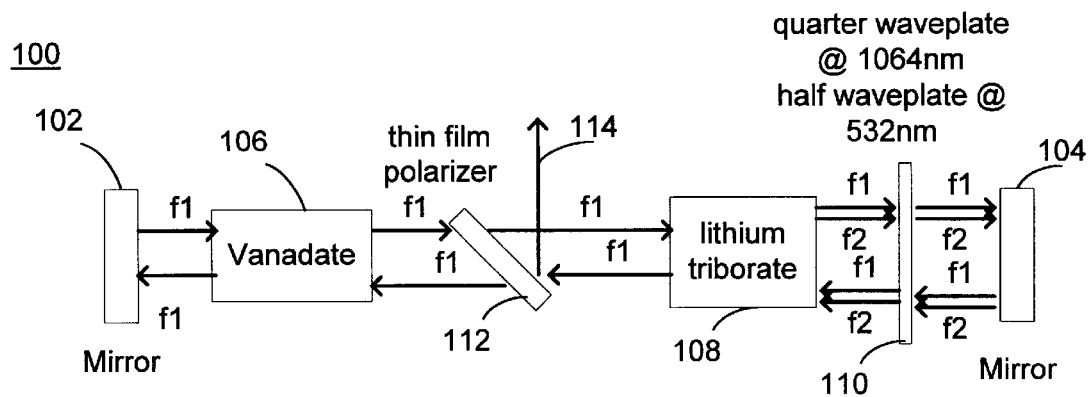
FIG. 1 is a schematic drawing showing one embodiment of the present invention using a waveplate and a thin film polarizer.

FIG. 1 depicts one embodiment of a mode-locked laser 100 in accord with the invention. In this embodiment, first mirror 102 is a high reflector at the fundamental laser frequency f1, second mirror 104 has a reflectivity at the second harmonic laser frequency f2 which is not greater than its reflectivity at the fundamental harmonic frequency f1 where the fundamental frequency is one half of the second harmonic frequency. In another embodiment of the invention, mirror 104 is a high reflector for both the fundamental frequency radiation and the second harmonic frequency radiation. First and second mirrors 102 and 104 define an optical resonator. The mirror curvature and spacing are chosen based on well known laser cavity design criterion. See for example the book *Lasers* by A. E. Siegman which is published by University Science Books, and is hereby incorporated by reference.

Active laser medium 106 is positioned between first mirror 102 and second mirror 104. In this embodiment, active laser medium 106 is diode pumped Nd:Vanadate, which emits fundamental wavelength of 1064 nm. Active laser medium 106 can be any laser gain medium including but not limited to Nd:YAG, Nd:YLF, Nd: Glass, Ti:sapphire, Cr:YAG, Cr:Forsterite, Yb:YAG, and Yb:glass. The choice of gain medium is typically based on criteria including but not limited to laser wavelength, and desired output pulsewidth which is related to the gain bandwidth.

Nonlinear optical medium 108 is positioned between active laser medium 106 and second mirror 104. In this embodiment nonlinear optical medium 108 is made of noncritically phase matched lithium triborate (LBO). In other embodiments, nonlinear optical medium 108 is other than non-critically phase matched. Radiation at the fundamental frequency is input into the lithium triborate crystal and is converted into second harmonic radiation. The conversion of the radiation from the fundamental frequency into the second harmonic frequency increases with increasing intensity of the fundamental frequency. In other embodiments of the invention, different nonlinear optical mediums can be used, including but not limited to Potassium Dihydrogen Phosphate (KDP), Potassium Titanyl Phosphate (KTP), Beta-Barium Borate (BBO), Periodically Poled Lithium Niobate (PPLN), and Potassium Niobate ($KNbO_3$). The nonlinear crystal selected for use in the invention will depend on criteria including but not limited to the material used in the active laser medium, the power handling characteristics of the material, the conversion efficiency, and the group velocity mismatch and group velocity dispersion which may be important in the generation of short pulses.

Polarization rotation device 110 is placed in the laser cavity between nonlinear optical medium 108 and second mirror 104. Polarization rotation device can be but is not limited to a one-quarter wave plate at the fundamental frequency and a one half waveplate at the second harmonic frequency or a one-quarter waveplate at the fundamental and a full wave at the second harmonic frequency. Furthermore, any of the wave plates used in the invention can have an additional integral number of full waves of retardation added to them. Polarization selection device 112 is placed between active laser medium 106 and nonlinear optical medium 108. Polarization selection device 112 is a thin film polarizer in this embodiment, but it can be any device which will selectively pass radiation at a first polarization with respect to radiation at a second polarization. Other suitable polarization selection devices include but are not limited to a polarizer cube, and an angled piece of glass.

In mode-locked laser 100 depicted in FIG. 1, when active laser medium 106 is pumped above threshold, mode-locked laser 100 will begin to oscillate. Fundamental frequency radiation f1 at a first polarization is emitted from active laser medium 106 and passes through polarization selection device 112. The fundamental frequency radiation then enters nonlinear optical medium 108. In nonlinear optical medium 108 some of the fundamental frequency radiation is converted into radiation at the second harmonic frequency f2. The ratio of the intensity of radiation at the second harmonic frequency relative to the intensity of radiation at the fundamental frequency increases with increasing intensity of the fundamental frequency radiation. The radiation at frequencies f1 and f2 exit nonlinear optical medium 108 and enter polarization rotation device 110. The radiation at the fundamental and second harmonic frequencies pass through polarization rotation device 110, bounce off second mirror 104 and pass a second time through polarization rotation device 110. Polarization rotation device 110 is a one half waveplate at the second harmonic frequency and a one quarter waveplate at the fundamental frequency. After two passes through polarization rotation device 110 the polarization of the radiation at the second harmonic frequency leaving polarization rotation device 110 is the same as the polarization of the second harmonic frequency radiation that entered polarization rotation device 110, while the polarization of the radiation at the fundamental frequency leaving polarization rotation device 110 is rotated from that of the radiation at the fundamental frequency entering polarization rotation device 110. The angle of rotation can be varied by rotating the waveplate. This allows the output coupling of the laser to be continuously varied during operation of the laser. This in turn allows optimization of the pulsewidth or output power of laser output 114.

Radiation at the fundamental and second harmonic frequencies reenter nonlinear optical medium 108. In order to obtain optimal reconversion, the fundamental and second harmonic frequencies must have the appropriate relative phase relationship. This is achieved by adjusting the optical path length the radiation at both frequencies propagates between conversion in nonlinear optical medium 108, bouncing off of mirror 104, reentering nonlinear optical medium 108 and reconversion in nonlinear optical medium 108. This optical path length can be adjusted in many ways, including but not limited to: using a temperature dependent index of refraction of a birefringent crystal, which may be the nonlinear crystal; rotating a birefringent crystal, which may be a non linear crystal, to adjust the index of refraction; adjusting the position of second mirror 104 to vary the propagation distance in air; tuning a glass plate through a small angle as described in U.S. Pat. No. 4,914658 by Krassimir Stankov, and Fritz Schaafer; or reflecting the radiation off of an optical coating.

The fundamental frequency radiation exiting the nonlinear optical medium 108 which resulted from the reconversion of the radiation at the second harmonic frequency is in the first polarization mode and therefore passes through polarization selection device 112 and into active laser medium 106 where it stimulates emission of fundamental frequency radiation into the first polarization mode. The fundamental frequency radiation which enters the nonlinear optical medium from polarization rotation device 110 has a polarization that is modified and thus, some of it is in the first polarization mode and some is polarized orthogonally. The fundamental frequency radiation which is polarized in the orthogonal polarization mode is not converted into second harmonic frequency radiation in the nonlinear optical medium and is not passed by polarization selection device 112. This radiation is output from the laser in laser output 114.

In this embodiment of the invention, the shorter the pulse of fundamental frequency radiation amplified by active laser medium 106, the higher the peak intensity of the radiation at the fundamental frequency. Consequently, the higher the peak intensity of the radiation at the fundamental frequency, the higher the amount of the fundamental frequency radiation that is converted into the second harmonic frequency in the nonlinear optical medium. The second harmonic frequency radiation is reconverted back into fundamental frequency radiation in the nonlinear optical medium and sent back to the active laser medium. Thus, the higher the peak intensity of the fundamental frequency radiation in mode-locked laser 100 between first mirror 102 and nonlinear optical medium, the lower the optical loss in the cavity.

For a laser with a pulse repetition rate of 120 MHz with 26 watts of diode pump power an output power of 5 watts and a pulsewidth of 5 picoseconds has been measured. When the pump power was in creased to 52 watts, an output power of 10 watts and a pulsewidth of 4 picoseconds was observed.

Figure 2:
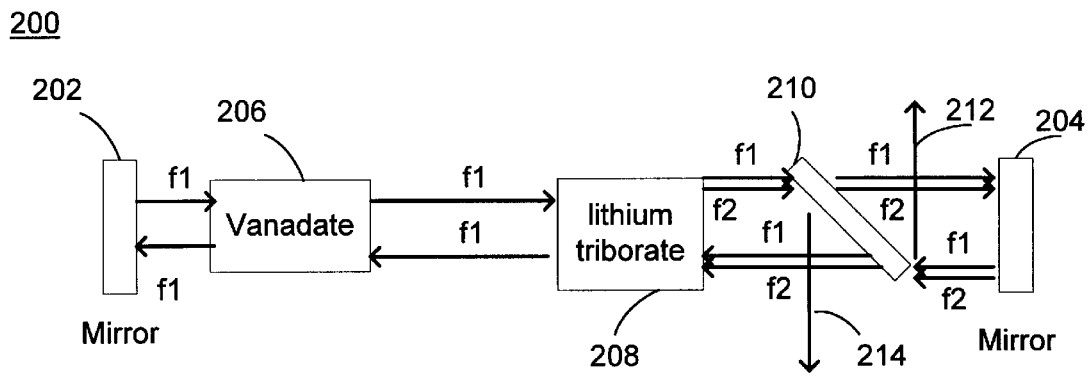
FIG. 2 is a schematic drawing showing another embodiment of the present invention using a thin film polarizer.

FIG. 2 depicts another embodiment of a mode-locked laser 200 in accord with the invention. In this embodiment, first mirror 202 is a high reflector at the filndamental laser frequency f1. Second mirror 204 has a reflectivity at the second harmonic laser frequency f2 which is not greater than its reflectivity at the fundamental frequency f1, where f1 is one half of f2. First and second mirrors 202 and 204 define an optical resonator. The mirror curvature and spacing are chosen based on well known laser cavity design criterion. See for example, *Lasers* by A. E. Siegman as referenced above.

Active laser medium 206 is positioned between first mirror 202 and second mirror 204. In this embodiment, active laser medium is diode pumped Nd:Vanadate, which emits fundamental wavelength of 1064 nm. Active laser medium 206 can be any laser gain medium including but not limited to Nd:YAG, Nd:YLF, Nd:Glass, Ti:sapphire, Cr:YAG, Cr:Forsterite, Yb:YAG, and Yb:glass. The choice of gain medium is typically based on criteria including but not limited to laser wavelength, and desired output pulsewidth which is related to the gain bandwidth.

Nonlinear optical medium 208 is positioned between active laser medium 206 and second mirror 204. In this embodiment nonlinear optical medium 208 is made of noncriticauly phase matched lithium triborate (LBO). In other embodiments, nonlinear optical medium 108 is other than non-critically phase matched. Radiation at the fundamental frequency, f1 input into the lithium triborate crystal is converted into second harmonic radiation f2. The conversion of the radiation from the fundamental frequency into the second harmonic frequency increases with increasing intensity of the fundamental frequency. In other embodiments of the invention, different nonlinear optical mediums can be used, including but not limited to Potassium Dihydrogen Phosphate (KDP), Potassium Titanyl Phosphate (KTP), Beta-Barium Borate (BBO), Periodically Poled Lithium Niobate (PPLN), and Potassium Niobate ($KNbO_3$). The nonlinear crystal selected for use in the invention will depend on criteria including but not limited to the material used in the active laser medium, the power handling characteristics of the material, the conversion efficiency, and the group velocity mismatch and group velocity dispersion which may be important in the generation of short pulses.

Polarization selection device 210 is positioned between nonlinear optical medium 208 and second mirror 204. Polarization selection device 210 is a thin film polarizer in this embodiment, but it can be any device which will selectively pass radiation at a first polarization with respect to radiation at a second polarization. Suitable polarization selection devices include but are not limited to a polarizer cube, and an angled piece of glass.

In mode-locked laser 200 depicted in FIG. 2, when active laser medium 206 is pumped above threshold mode-locked laser 200 will begin to oscillate. Fundamental frequency radiation f1 is emitted from active laser medium 206 and enters nonlinear optical medium 208. In nonlinear optical medium 208 some of the fundamental frequency radiation is converted into second harmonic frequency radiation f2. The ratio of the intensity of radiation at the second harmonic frequency relative to the intensity of radiation a the fundamental frequency increases with increasing intensity of the fundamental frequency radiation. Radiation at the second harmonic frequency is in a second polarization mode, which may or may not be orthogonal to the first polarization mode, while the radiation at the fundamental frequency remains in the first polarization mode. Polarization selection device 210 is configured to preferentially transmit radiation at the second polarization. Thus, radiation at the second harmonic frequency passes through polarization selection device 210, reflects off second mirror 204 and passes again through polarization selection device 210 and back into nonlinear optical medium 208 and is reconverted into radiation at the fundamental frequency. The fundamental frequency radiation is partially reflected from polarization selection device 210 and exists the resonator as output beams 212 and 214.

In order to obtain optimal reconversion, the fundamental and second harmonic frequencies must have the appropriate relative phase relationship. This is achieved by adjusting the optical path length the radiation at both frequencies propagates between conversion in nonlinear optical medium 208, bouncing off of mirror 204, reentering nonlinear optical medium 208 and reconversion in nonlinear optical medium 208. This optical path length can be adjusted in many way as discussed above.

The fundamental frequency radiation exits the nonlinear optical medium and reenters into active laser medium 206 where it stimulates emission of fundamental frequency radiation in the first polarization mode. In this embodiment of the invention, the shorter the pulse of fundamental frequency radiation amplified by active laser medium 206, the higher the peak intensity of the radiation at the fundamental frequency. Consequently, the higher the peak intensity of the radiation at the fundamental frequency, the higher the amount of the radiation at the fundamental frequency that is converted into the second harmonic frequency in the nonlinear optical medium. The second harmonic frequency radiation is passed at lower loss than the radiation at the fundamental frequency from nonlinear optical medium 208 to second mirror 204 and back to nonlinear optical medium 208. At nonlinear optical medium 208 the radiation at the second harmonic frequency is reconverted back into fundamental frequency radiation and sent back to the active laser medium. Thus, the higher the peak intensity of the fundamental frequency radiation in mode-locked laser 200 between first mirror 202 and nonlinear optical medium, the lower the optical loss in the cavity.

Figure 3:
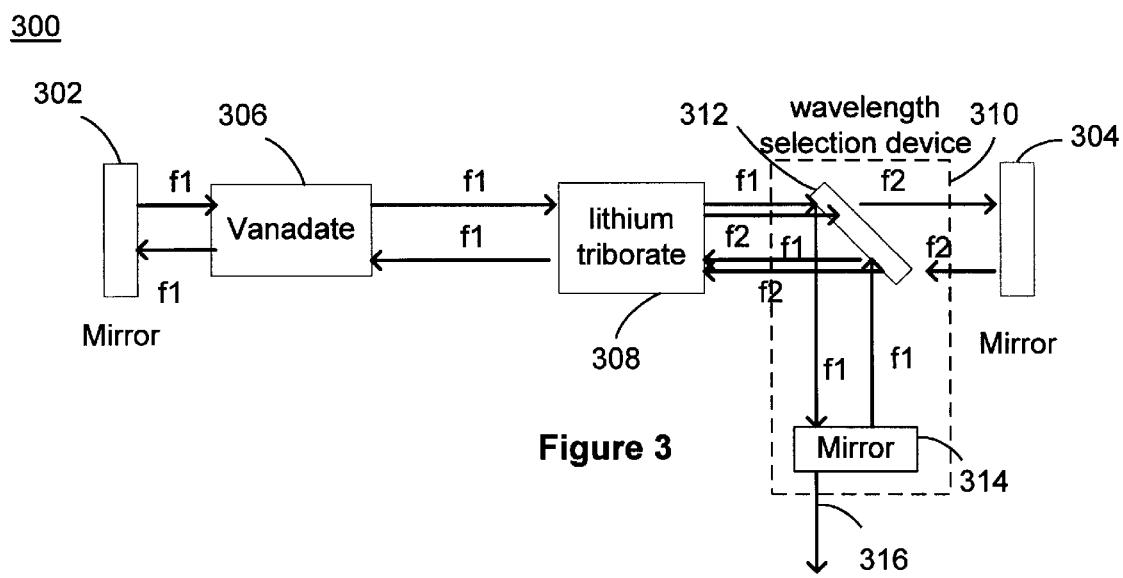
FIG. 3 is a schematic drawing showing yet another embodiment of the present invention using a wavelength selection device.

FIG. 3 depicts another embodiment of a mode-locked laser 300 in accord with the invention. In this embodiment, first mirror 302 is a high reflector at the fundamental laser frequency f1, second mirror 304 has a higher reflectivity at the fundamental laser frequency than it is at the second harmonic frequency f2 where f1 is one half of f2. First and second mirrors 302 and 304 define an optical resonator.

Active laser medium 306 is positioned between first mirror 302 and second mirror 304. In this embodiment, active laser medium is Nd:Vanadate, which emits fundamental wavelength of 1064 nm. Active laser medium 206 can be any laser gain medium including but not limited to Nd:YAG, Nd:YLF, Nd:Glass, Ti:sapphire, Cr:YAG, Cr:Forsterite, Yb:YAG, and Yb:glass. The choice of gain medium is typically based on criteria including but not limited to laser wavelength, and desired output pulsewidth which is related to the gain bandwidth.

Nonlinear optical medium 308 is positioned between active laser medium 306 and second mirror 304. In this embodiment nonlinear optical medium 208 is made of noncritically phase matched lithium triborate (LBO). In other embodiments, nonlinear optical medium 108 is other than non-critically phase matched. Radiation at the fundamental frequency, f1 input into the lithium triborate crystal is converted into second harmonic radiation f2. The conversion of the radiation from the fundamental frequency into the second harmonic frequency increases with increasing intensity of the fundamental frequency. In other embodiments of the invention, different nonlinear optical mediums can be used, including but not limited to Potassium Dihydrogen Phosphate (KDP), Potassium Titanyl Phosphate (KTP), Beta-Barium Borate (BBO), Periodically Poled Lithium Niobate (PPLN), and Potassium Niobate ($KNbO_3$). The nonlinear crystal selected for use in the invention will depend on criteria including but not limited to the material used in the active laser medium, the power handling characteristics of the material, the conversion efficiency, and the group velocity mismatch and group velocity dispersion which may be important in the generation of short pulses.

Wavelength selection device 310 is positioned between nonlinear optical medium 308 and second mirror 304. Wavelength selection device 310 is a dichroic beam splitter 312 and mirror 314 in this embodiment. In one embodiment of the invention, dichroic beam splitter 312 has a higher reflectivity at the fundamental frequency and higher transmission at the second harmonic frequency. Mirror 314 is partially reflective at the fundamental frequency with no restrictions on it reflectance at the second harmonic frequency. Transmitted beam 316 is the output beam. In other embodiments of the invention, wavelength selection device 310 can be any device which will preferentially reflect radiation at the fundamental frequency more than radiation at the second harmonic frequency and transmit radiation at the second harmonic frequency. In one embodiment, wavelength selection device 310 is a polarizing beam splitter cube.

In mode-locked laser 300 depicted in FIG. 3, when active laser medium 306 is pumped above threshold, mode-locked laser 300 will begin to oscillate. Fundamental frequency radiation f1 is emitted from active laser medium 306 and enters nonlinear optical medium 308. In nonlinear optical medium 308 some of the fundamental frequency radiation is converted into second harmonic frequency radiation f2. The ratio of the intensity of radiation at the second harmonic frequency relative to the intensity of radiation at the fundamental frequency increases with increasing intensity of the fundamental frequency radiation.

Wavelength selection device 310 is configured to preferentially transmit radiation at the second harmonic frequency to second mirror 304 and reflect radiation at the fundamental frequency to mirror 314. Thus, radiation at the second harmonic frequency passes through wavelength selection device 310, reflects off second mirror 304 and passes again through wavelength selection device 310 and back into nonlinear optical medium 308 and is reconverted into radiation at the fundamental frequency. Fundamental frequency radiation reflects off of dichroic beam splitter 312 and is partially reflected and partially transmitted by mirror 314. The reflectance and transmittance of mirror 314 can be chosen using the output power, output pulsewidth tradeoffs discussed above.

In order to obtain optimal reconversion, the fundamental and second harmonic frequencies must have the appropriate relative phase relationship. This is achieved by adjusting the optical path length the radiation at both frequencies propagates between conversion in nonlinear optical medium 308 and reconversion in nonlinear optical medium 308. This optical path length can be adjusted in many way as discussed above.

The fundamental frequency radiation exiting the nonlinear optical medium reenters active laser medium 306 where it stimulates emission of fundamental frequency radiation in the first polarization mode.

In this embodiment of the invention, the shorter the pulse of fundamental frequency radiation amplified by active laser medium 306, the higher the peak intensity of the radiation at the fundamental frequency. Consequently, the higher the peak intensity of the radiation at the fundamental frequency, the higher the amount of the fundamental frequency radiation that is converted into the second harmonic frequency in the nonlinear optical medium. The second harmonic frequency radiation is reconverted back into fundamental frequency radiation in the nonlinear optical medium and sent back to the active laser medium. Thus, the higher the peak intensity of the fundamental frequency radiation in mode-locked laser 300 between first mirror 302 and nonlinear optical medium, the lower the optical loss in the cavity.

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the invention. Thus, the present invention is not intended to be limited to the embodiments disclosed, but is to be accorded the widest scope consistent with the principles and features disclosed herein.

What is claimed is:

1. A mode-locked laser, comprising:
    a first mirror and a second mirror defining an optical resonator;
    an active laser medium that upon stimulation by an output from a pump source emits laser radiation at the fundamental frequeny in a plurality of longitudinal modes, the active laser medium being positioned between the first and second mirrors;
    a non-linear optical medium positioned between the active laser medium and the second mirror that generates radiation at a second harmonic frequency with a round trip optical path length from the non-linear optical material to the second mirror selected such that a majority of the second harmonic returning from the second mirror to the non-linear optical material is reconverted to the fundamental frequency;
    a polarization rotation device positioned between the non-linear optical medium and the second mirror; and
    a polarization selection device positioned between the first mirror and the second mirror for output coupling an output of at least a portion of fundamental radiation as a train of mode-locked pulses;
    wherein a combination of the reconversion of the second harmonic back to the fundamental frequency, the polarization rotation device and the polarizaton selection device, causes a loss for a less intense portion of the pulse to be geater than for a more intense portion.

2. The laser of claim 1, wherein:
    the polarization rotation device comprises a one quarter waveplate at the fundamental frequency and one half waveplate at the second harmonic frequency.

3. The laser of claim 1, wherein:
    the polarization rotation device comprises a one quarter waveplate at the fundamental frequency and a whole wave waveplate at the second harmonic frequency.

4. The laser of claim 1, wherein:
    the polarization selection device comprises a thin film polarizer.

5. The laser of claim 1, wherein:
    the polarization selection device comprises a polarizing beam splitter.

6. The laser of claim 1, wherein:
    the active laser medium includes Nd:Vanadate.

7. The laser of claim 1, wherein:
    the non-linear optical medium includes Lithium Triborate.

8. The laser of claim 1, wherein:
    the laser cavity includes at least three mirrors.

9. The laser of claim 1, wherein:
    the reflectivity of the second mirror at the second harmonic frequency is not greater than its reflectivity at the fundamental frequency.

10. A mode-locked laser, comprising:
    a first mirror and a second mirror defining an optical resonator;
    an active laser medium that upon stimulation by an output from a pump source emits laser radiation at the fundamental frequency in a plurality of longitudinal modes, the active laser medium being positioned between the first and second mirrors;
    a non-linear optical medium positioned between the active laser medium and the second mirror that generates radiation at a second harmonic frequency with a round trip optical path length from the non-linear optical medium to the second mirror selected such that a majority of the second harmonic returning from the second mirror to the non-linear optical material is reconverted to the fundamental frequency;
    a polarization selection device positioned between the non-linear optical medium and the second mirror for output coupling an output of at least a portion of the fundamental radiation as a train of mode-locked pulses; and
    wherein a combination of the reconversion of the second harmonic back to the fundamental frequency and the polorization selection device, causes a loss for a less intense portion of the pulse to be greater than for a more intense portion.

11. The laser of claim 10, wherein:
    the polarization selection device comprises a thin film polarizer.

12. The laser of claim 10, wherein:
    the polarization selection device comprises a polarizing beam splitter.

13. The laser of claim 10, wherein:
    the active laser medium includes Nd:Vanadate.

14. The laser of claim 10, wherein:
    the non-linear optical medium includes Lithium Triborate.

15. The laser of claim 10, wherein:
    the laser cavity includes at least three mirrors.

16. The laser of claim 10, wherein:
    the reflectivity of the second mirror at the second harmonic frequency is not greater than its reflectivity at the fundamental frequency.

17. A method of mode-locking a laser that has an output of a train of pulses, comprising:
    converting radiation in the laser at a fundamental frequency into radiation at a second harmonic frequency;
    discriminating the radiation at the fundamental frequency using a polarization of the radiation at the fundamental frequency; and
    reconverting the radiation at the second harmonic frequency into radiation at the fundamental frequency; and
        wherein a combination of the reconversion of the second harmonic back to the fundamental frequency and the discrimination at the fundamental frequency, causes a loss for a less intense portion of the pulse to be greater than for a more intense portion.

18. The method of claim 17, including:
    introducing an additional a phase shift in the radiation at the fundamental frequency relative to the radiation at the second harmonic frequency.

19. The method of claim 18, wherein:
    introducing the phase shift includes propagating the fundamental frequency radiation through a birefringent crystal at a predetermined orientation.

20. The method of claim 19, wherein:

the birefringent crystal is a nonlinear optical medium.

21. The method of claim 18, wherein:

introducing the phase shift includes propagating the fundamental frequency radiation a predetermined distance in air.

22. The method of claim 18, wherein:

introducing the phase shift includes propagating the fundamental frequency radiation through a glass plate.

23. The method of claim 18, wherein:

introducing the phase shift includes reflecting the fundamental frequency radiation using an optical coating.

24. The method of claim 18, wherein:

introducing additional phase shift includes using a temperature dependent phase shift in a birefringent crystal.

25. The method of claim 24, wherein:

the birefringent crystal is a nonlinear optical medium.

26. The method of claim 17, wherein:

discriminating includes passing the fundamental frequency radiation through a thin film polarizer.

27. The method of claim 17, wherein:

discriminating includes passing the fundamental frequency radiation through a polarizing beam splitter.

28. The method of claim 17, wherein:

the laser includes Nd:Vanadate.

29. The laser of claim 17, wherein:

converting includes using Lithium Triborate.

30. The method of claim 17, wherein:

discriminating includes rotating the polarization of the fundamental frequency radiation.

31. The method of claim 30, wherein:

rotating includes using a waveplate.

32. The method of claim 31, wherein:

the waveplate comprises a one quarter waveplate at the fundamental frequency and one half waveplate at the second harmonic frequency.

33. The method of claim 31, wherein:

the waveplate comprises a one quarter waveplate at the fundamental frequency and a whole wave waveplate at the second harmonic frequency.

* * * * *